Figure 2:
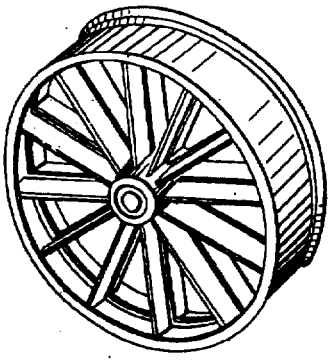
Figure 1:
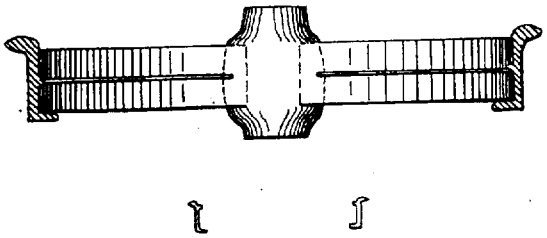

8467X

J. STIMPSON.

Car Wheel.

Patented Oct. 23, 1834.

AM. PHOTO-LITHO. CO. N.Y. (OSBORNE'S PROCESS.)

[illegible] Oct. 23, 1834

James Stimpson Baltimore Maryland

Letters Patent

The Schedule referred to in these Letters Patent and making part of the
same containing a description in the words of the said James Stimpson
himself of his improvement in the mode of constructing wheels for the use
of Rail Road Cars or Locomotive Engines To all to whom these presents shall come. Be it known that I
James Stimpson of the City and County of Baltimore and State of Mary
land have invented a new and useful improvement in the mode of construc
ting Wheels for the use of Rail Road Cars or Locomotive Engines
and that the following is a full and exact description thereof.
The rim and Spokes of the wheel are to be made of wrought iron. the
hub of cast iron. The spokes may be made in the form of a cross and
[illegible] quite as wide as the treads of the wheel. varying in thickness
according to the weight they are intended to carry say a quarter to
half an inch. a rib should be formed upon each side of said spoke
near their centres of the same thickness as the spokes or more at
their bases contracted a little by a taper thence to their outer extrem
ities said ribs may be also varied both in thickness and width as
desired but for passenger Cars say to project five eighths of an inch
in width from the spoke on each side may be sufficient. said spokes
may be rolled in that form. the said ribs should terminate a little
short of the outer ends of the spokes to fit exactly join to and termi
nate upon the interior edge of an internal flanch or rib within the
circumference of the rim of the wheel as will be more fully explain
ed hereafter. A wooden pattern may be made to represent the hub
and spokes of such wheel as is wanted with the spokes formed in
[illegible] shape and size like the rolled wrought iron spokes. said
pattern should be made to divide or open in the centre of the ribs of
the spokes that when moulded in the sand the flasks [illegible] and
[illegible] each a part of the mould so that when the pat tern is withdrawn from the sand the iron spokes may be laid into
the mould and the cope closed down over them. in this way the hub may
be cast upon the spokes. The hub should be sufficiently large to enclose
a proper length of the spokes for strength. and yet their inner ends
should not be allowed to extend ~~to extend~~ to within about one half
of an inch of the axle. Thus when the hub is cast it will represent
a hub and spokes without a rim. but the ribs on the spokes should
not be allowed to extend into the hub over an eighth of an inch, for they
would very nearly divide the hub into two parts perpendicularly through
it and thereby make it unsafe for use. The rim on the exterior m
be formed as usual with a flanch and cone, or no cone as desired. or
the exterior there are to be formed two internal flanches or ribs pro
jecting inwards from the interior of the rim as wide or deep as may be
desired. varying according to the objects for which they are intended to
be used. One of said rims or flanches should be formed at the edge
of the inner periphery of the outside of the wheel diagonally opposite
to the external flanch. and it may be made say three quarters of
an inch thick at the base tapering to half an inch across the inner
edge more or less and one inch and a half wide or deep including
the thickness of the rim of the wheel. more or less. this proportion
may be proper for a passenger Car. and the average thickness of
the rim three eighths of an inch. The other rib may be placed midw
between this internal and the external flanch, or nearer to the o
ternal if desired. This rib may not be so deep as the other. it m
project within the rim say five eighths of an inch more or less. a
must be as thick as the ribs on the spokes as they are to be fitted to
and [illegible] upon the inner periphery of this rib. it may be made
[illegible] than the ribs on the spokes if desired. I use from nine to twelve
spokes for a three to four feet wheel. and then nine to twelve no
are to be formed [illegible] in the last described internal flanch or
equidistant from each other of a form and size just to fit over
to the outer ends of the spokes. these notches are only to be cut fu
deep enough to allow the outer ends of the spokes to pass through.

[illegible]

when the rim is expanded by heat. to the extent it will bear without
injury. there must also be formed notches in the exterior ends of the
spokes just as deep as the sole of the notch made in the internal rim
is from the inner periphery of the rim of said wheel. and also as wide
as the rib itself so that the notch in the end of the spoke shall exac
ly span and fit tight to the rib on the inner periphery of the wheel —
within the said notches and at the same time the ends of the ribs on
each side of the spokes are to be formed so exactly to fit upon the inner
periphery of the rib when the tire or rim of the wheel is shrunk by cool
ing to its natural size. though care must be had to calculate and man
the diameter of the spokes and rim so to agree with each other that when
cold the rim shall hug the spokes as tight as they will bear. and at the
same time be the most secure. lasting and safe for use.

Here then it will be seen that the objects of these internal ribs or flanges
are to answer two special purposes. the first is to secure strength and
firmness in the rim from flexure with but a small quantity and weig
of metal. and the second is to secure the rim to the spokes against
any lateral or other movement without screw bolts nuts or rivets.

This form of rim will evidently save a great weight of iron and
yet be much stronger than cast iron wheels as usually made. the inter
nal ribs are a complete substitute for the cast iron rim in point of
strength and firmness. while the rim itself will not be near so lia
ble to stretch whereby to become loose upon the spokes as the usual
wrought iron tire when shrunk in the usual way over a solid cast
iron rim. neither could wood within my tire be of any use. no screw
bolts nuts or rivets to work loose. which require to be looked after.
and with spokes formed as described. their lightness and yet firmness
all combine to make a wheel of less material by one half the usual cast
iron wheels intended for passenger cars and yet will withstand a blow
of more than twice the force that a cast iron wheel could without breaking
Hence wheels of this construction may be made large. the necessary weight
being so small as not to be regarded. In a train this will be an imm
ense saving of power. wear and tear to the road and cars. The outer edges of the spokes should be made to fit up tight to the inside o[f]
the outer flanch or rib as it will add great additional security to th[e]
notches in the spokes against lateral movement; as the inclination
the peripheries of the wheels is inwards or towards each other: hence [illegible]
inside of the deep rib as well as the space beyond the sole of the notch[es]
abundantly secure the rims to the spokes from any lateral movement
It is my intention first to roll the rim in a set of dies approximating
in a small degree towards the shape of the rim when finished by a[n]
estimate based upon a calculation of the necessary weight. and a few e[x]
periments the exact weight necessary to form a wheel of a certain [illegible]
[illegible] by the roller dies may be had to enable us to round up and weld [illegible]
rough rolled bar before passing it through the finishing dies: in whi[ch]
last state the rollers when brought tight together will leave the rim [illegible]
and so perfect on the surface as to require no turning and yet be ma[de]
the exact size that may be wanted. The upper roller of course a[illegible]
form the external flanch cone and the face of the tread of the whee[l]
and a part of thickness of the rim while the under roller will form [illegible]
remainder of the thickness of the rim and the internal flanches or [illegible]
The dies in the under roller must be on the outside of its journals whi[le]
the upper roller must be made so as to be raised by two screws geared [illegible]
gether to receive the hoop for rolling and then force the upper roller [illegible]
gradually by the screws as the rollers revolve. until they touch eac[h]
other when the rim will be finished and must then be removed as
quick as possible. The hub and spokes must be put into a chu[ck]
lathe. the hole bored out to receive the axle. then fixed upon an ar[bor]
in a lathe, the ends of the spokes ground off by passing round by
an emery wheel in quick motion with a lateral movement to the
emery wheel to keep it level or straight upon its surface. or before a
stone and then a burr cutter so formed as to make a finish to the ends [illegible]
the ribs. and also the notches in the ends of the spokes and after [illegible]
are thus prepared the rim must be heated in a close furnace an[d]
shrunk upon the spokes. which will then form a wheel perfect[ly]
true from the centre every way or it may be done in any other wa[y]

[illegible]

[illegible] may please. I mention it only the more fully to illustrate
the construction of the wheel &c

What I claim as my invention is the internal flanches or ribs with
in the inner periphery of the rim of the wheel and the form and mode
of fitting the spokes so as to connect them and the rim together without
screw bolts or rivets as set forth in the above specification or in any other
form or mode of construction which effects the same purpose by the
same principles

Witnesses
James H Stimpson
Julia M Stimpson

James Stimpson

Drawing

[illegible] 18 words